United States Patent [19]
Falk et al.

[11] Patent Number: 5,402,262
[45] Date of Patent: Mar. 28, 1995

[54] LAYER ELEMENT HAVING A PLURALITY OF MONOMOLECULAR LAYERS

[75] Inventors: Uwe Falk, Wiesbaden; Werner Hickel, Ludwigshafen, both of Germany; Donald Lupo, Kawagoe, Japan; Ude Scheunemann, Liederbach/Taunus, Germany

[73] Assignee: Hoechst Aktiengesellschaft, Frankfurt am Main, Germany

[21] Appl. No.: 108,118

[22] Filed: Aug. 17, 1993

[30] Foreign Application Priority Data

Aug. 19, 1992 [DE] Germany .................. 42 27 378.1

[51] Int. Cl.$^6$ .................................. G02F 1/35
[52] U.S. Cl. ...................... 359/326; 252/582; 428/507
[58] Field of Search ............... 359/326–332; 385/122, 141, 143, 145; 252/582, 584; 156/60, 99, 103, 272.2, 273.7; 428/425.1, 479.3, 481, 507–510, 526, 527

[56] References Cited

U.S. PATENT DOCUMENTS

| 4,539,061 | 9/1985 | Sagiv | 156/272.2 X |
| 4,792,208 | 12/1988 | Ulman et al. | 385/143 |
| 5,034,227 | 7/1991 | Nickel | 424/195.1 |

FOREIGN PATENT DOCUMENTS

| 0301411 | 2/1989 | European Pat. Off. |
| 2201155 | 8/1988 | United Kingdom |
| WO92/10781 | 6/1992 | WIPO |

OTHER PUBLICATIONS

Advanced Materials (1991) vol. 3, No. 1, "Amphiphilic Dyes for Nonlinear Optics: Dependence of Second Harmonic Generation on Functional Group Substitution", pp. 54–58, (no month) Bubeck et al.
Derwent Abstract No. JP 1125219 A. (May 1989).
Thin Solid Films, 133, "Monomolecular and Multimolecular Films of Cellulose Esters with Various Alkyl Chains", pp. 29–38, Kawaguchi et al, Nov. 1985.

*Primary Examiner*—John D. Lee
*Attorney, Agent, or Firm*—Curtis, Morris & Safford

[57] ABSTRACT

A layer element comprises a plurality of monomolecular layers in a regular and alternating arrangement ABABAB . . . on a substrate, wherein A is a layer of a dye whose chromophore has a donor-acceptor structure and B is a layer of cellulose whose hydroxyl groups are at least partly substituted by the radical

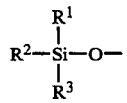

where $R^1$ and $R^2$ are each independently of the other an alkyl radical of from 1 to 4 carbon atoms and $R^3$ is an alkyl radical of from 1 to 18 carbon atoms or phenyl, tolyl or benzyl. It is useful for nonlinear optics.

10 Claims, 8 Drawing Sheets

EXAMPLE

PRINCIPLE

HYDROPHOBIC CHAIN

ELECTRON DONATOR

CONJUGATED SYSTEM

ELECTRON ACCEPTOR

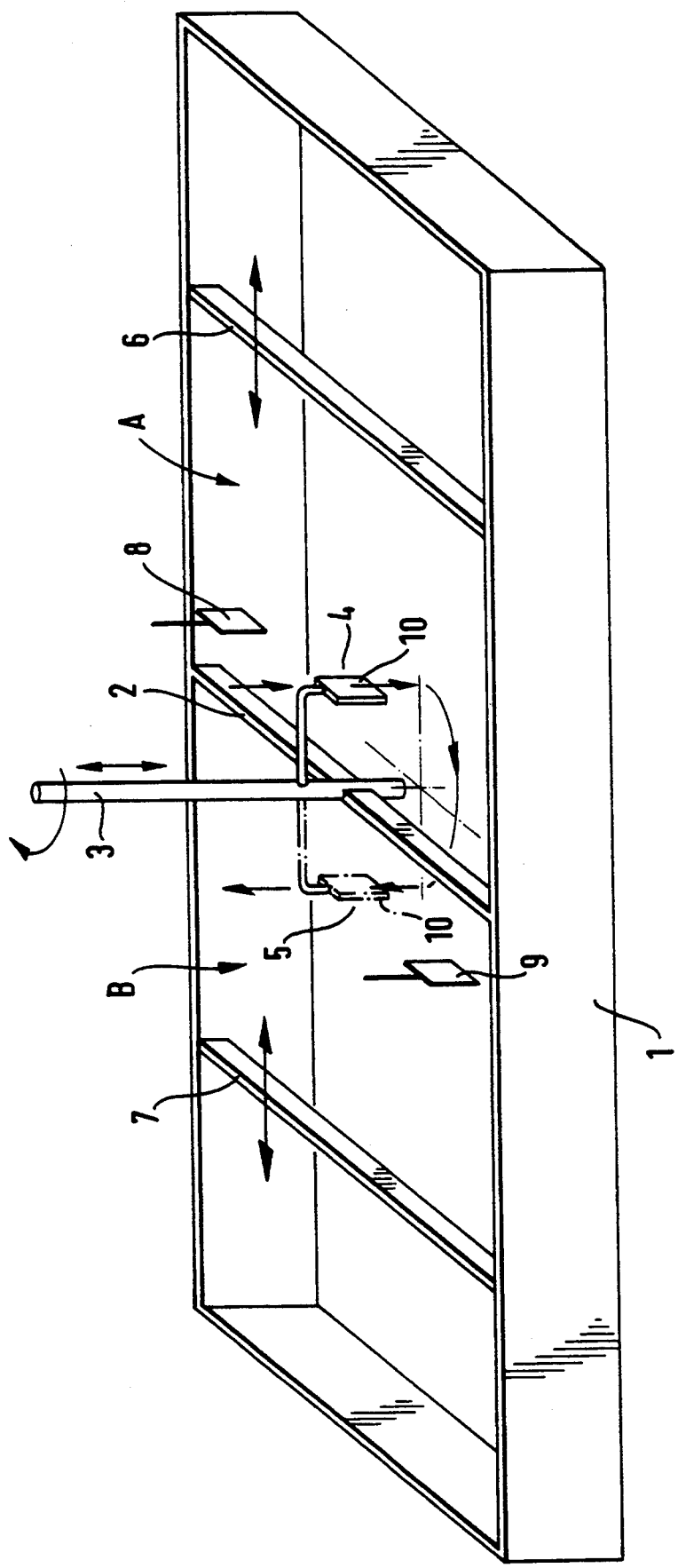

LAYER ELEMENT HAVING A PLURALITY OF MONOMOLECULAR LAYERS

DESCRIPTION

The present invention relates to a layer element wherein a substrate supports a plurality of monomolecular layers in a regular and alternating arrangement. Some of the layers contain a chromophore having a high second-order molecular hyperpolarizability, so that the layer element is suitable for NLO processes.

The technical application of second-order nonlinear optical (NLO) processes (e.g. data storage: frequency doubling (SHG) of semiconductor lasers, telecommunications: optical frequency mixing, parametric amplification) requires materials having high NLO susceptibilities of second order ($\chi^{(2)}$). High second-order molecular hyperpolarizabilities are shown by organic molecules that are chromophores with a donor-acceptor structure. To utilize the molecular properties in a material, it is necessary for the chromophores to be oriented in a noncentrosymmetric arrangement.

One way of orienting chromophores is by the Langmuir-Blodgett (LB) technique. In the LB technique, the chromophores become ordered at the water-air interface and can be transferred to a substrate by dipping the latter through the water-air interface. Bubeck et al. (Adv. Mater.3 (1991) 1, 54 to 58) describe SHG and chromophore orientation in LB dye monolayers. The paper confirms the good orientation of chromophores in the LB monolayer when SHG activity is good.

The preparation of noncentrosymmetric multilayers is possible in principle by the alternating application of active (chromophore-containing) and inactive (chromophore-free monomer or polymer) layers. One prerequisite for high $\chi^{(2)}$ values of the multilayers is the preservation of the orientation of the chromophores in the deposition of alternating layer assemblies.

As in-house experiments have shown, the chromophore orientation in the alternating multilayer system is dependent on the inactive layer. It is therefore the object to devise a layer element whose inactive layer (layer free of dye) is made of a material which does not affect the orientation of the chromophore in the alternating multilayer to any significant extent, if at all. This property shall ideally be independent of the active layer (containing the chromophore). More particularly, the inactive layer of the layer system shall have low thickness, good optical quality (minimal attenuation) and good thermal stability.

There has now been found a layer element comprising a plurality of monomolecular layers in a regular and alternating arrangement on a substrate, wherein in each case a layer of a dye whose chromophore has a donor-acceptor structure alternates with a layer comprising cellulose whose hydroxyl groups are at least partly substituted by the radical $R^1R^2R^3SiO$—, where $R^1$ and $R^2$ are each independently of the other an alkyl radical of from 1 to 4 carbon atoms and $R^3$ is an alkyl radical of from 1 to 18 carbon atoms or phenyl, tolyl or benzyl. Preference is given to trimethylsilylcellulose (TMSC).

The Langmuir-Blodgett technique makes it possible to prepare ordered monomolecular films at the water-air interface. For this, water-insoluble amphiphilic molecules (monomers or polymers) are spread over the water surface from a solution in a volatile solvent. Subsequent compression with a barrier produces a two-dimensional ordered film at the water-air interface. To transfer the monomolecular film to a solid substrate, the substrate is dipped perpendicularly through the water-air interface. By repeated dipping it is possible to transfer multilayers to the substrate.

Customary amphiphilics are in general not NLO-active. To prepare NLO-active monolayers by the Langmuir-Blodgett technique it is therefore necessary to use molecules which are amphiphilic and additionally contain a chromophore with a donor-acceptor structure. The basic molecular structure for a functionalized monomer or polymer is shown in FIG. 1. Owing to the amphiphilic character of the molecule as a whole, the chromophores become oriented perpendicularly to the water surface at the water-air interface in the course of the film formation process and the molecules can be transferred to a solid substrate in that oriented ordered state. However, the transfer of multilayers to a substrate as described above leads to a centrosymmetric layer system, since the hydrophilic part of one layer will usually be adjacent to the hydrophilic part of the other layer and between them the two layers virtually define a plane of symmetry. A layer system of this type does not exhibit second-order NLO effects.

One way of preventing centrosymmetry in the multilayer system is to produce alternating layers by transferring NLO-active and NLO-inactive layers to the substrate alternately.

The production of alternating layers requires an AB trough. An example of such a system is shown in FIG. 2. It consists of a trough (1), which is divided by a fixed barrier (2). The two halves of the trough (A, B) are filled with a liquid phase (not depicted), which moves freely underneath the barrier (2). In each half of the trough (A, B) a film can be produced on the liquid phase independently of the other half. For alternating coating the substrate (10) is dipped by means of the film lift (3) through the layer in the A half at the location (4), moved underneath the barrier (2) into the part B and passed upward through the layer (not depicted) at the location (5). Close to the barrier (2), in particular between the locations (4) and (5), the trough is somewhat deeper (not depicted). To adjust the pressure in the individual layers, the movable barriers (6) and (7) are moved along the surface of the liquid in the arrowed direction. Pressure measurement in the regions A and B is by the Wilhelmi plates (8) and (9). Such a trough is known for example from EP-A-0 183 426.

Alternating multilayers were prepared using as examples of active layer components a monomer and a polymer of the following structures:

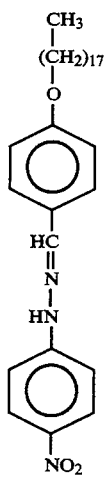
I
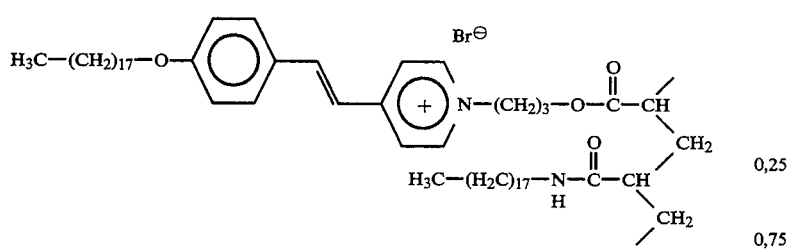
II
The below-listed monomers and polymers were used as inactive components of the alternating layer system:
N-Octadecylacrylamide:
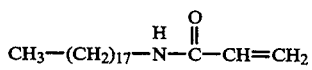
ω-Tricosenoic acid:
$H_2C=CH-(CH_2)_{20}-COOH$
PO 86:
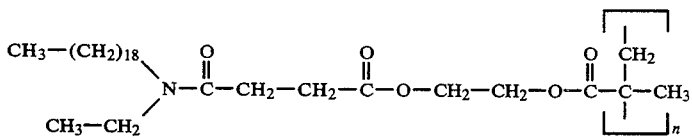
Polyisobutyl methacrylate:
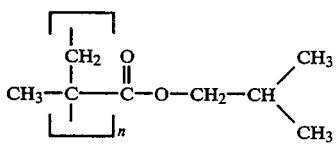
TMSC:

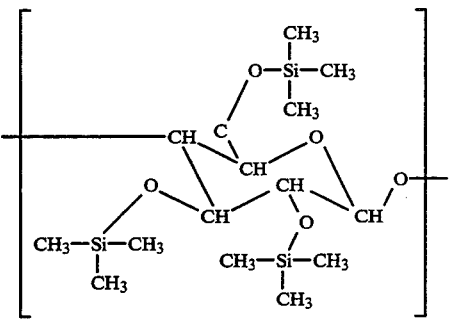

The amphiphilic monomers N-octadecylacrylamide (ODAA) and ω-tricosenoic acid (ω-tric) form solid-analogous films—with partly crystalline alkyl chains. The amphiphilic polymer PO86 forms a fluid-analogous film—with amorphous alkyl chains. Polyisobutyl methacrylate (PiBMA) and trimethylsilylcellulose (TMSC) are not amphiphilic in the classic sense, yet they none the less form amorphous, monomolecular films on the water surface, which are readily transferable to solid substrates. The compounds ODAA, ω-tric, PO86 and PiBMA are used for comparison.

The inactive layer must not affect chromophore orientation among other requirements. They include thermal stability, low thickness and good optical quality. Owing to their higher stability, polymers are superior to monomers. TMSC (trimethylsilylcellulose) proves to be a substance which meets all these conditions. Since PiBMA and TMSC films are very thin, having no long hydrophobic alkyl chains, they are advantageous compared with PO86. All the polymers listed, in particular TMSC, have been experimentally observed to have a good optical quality, i.e. low optical attenuation in waveguide layers.

The interaction of light with matter is described by the polarization P. At low light intensities, the polarization is proportional to the electric field strength E:

$$P = \epsilon_0 \chi^{(1)} E$$

At high light intensities, i.e. high field strengths, the linear relationship between P and E no longer applies. The polarization of the matter is described by a power series in E:

$$P = \epsilon_0 (\chi^{(1)} E + \chi^{(2)} E^2 + \chi^{(3)} E^3 \ldots)$$

The terms of higher order are responsible for a multiplicity of nonlinear optical effects. A detailed description is given in The Principles of Nonlinear Optics, by Y. R. Shen (John Wiley, 1984).

The second-order NLO processes are described by the term $\chi^{(2)} E^2$. The most important phenomena are the Pockels effect, frequency doubling, frequency mixing and parametric amplification. Silyl derivatives of cellulose and methods for making fibers and films from regenerated cellulose are known not only from the paper by G. Greber and O. Paschinger in das Papier 35 (1981), 547–554, but also from DE-A 31 04 529. Cellulose is silylated with trimethylchlorosilane and solutions of the silylated cellulose in organic solvents are converted into shaped articles.

The preparation of silylated cellulose is also known from J. Polym. Sc. Part A-1, (1969), 7 (7), 1947 and Makromol. Chemie 1968, 120, 87 to 95.

To prepare a monolayer of silylated cellulose, the silylated cellulose is advantageously dissolved in volatile organic solvents, such as methylene chloride, chloroform, benzene, hexane or ethyl acetate, in concentrations of from 0.01 to 1% by weight, the solution is spread on the surface of the water in the Langmuir trough, the solvent in the solution of silylated cellulose applied to the water surface is removed by evaporation, and the monolayer is precompressed in a conventional manner before being transferred to a solid substrate.

BRIEF DESCRIPTION OF DRAWINGS

FIG. 2 is a front perspective view of an AB trough for the production of alternating layers in accordance with the teachings of the present invention.

EXAMPLES

Figure 1B:
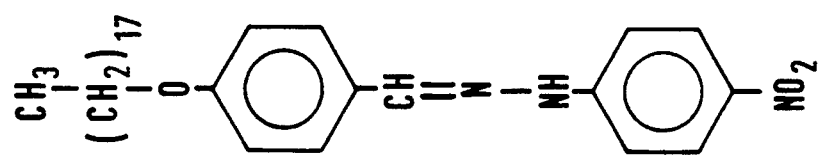
FIGS. 1A and 1B illustrate in principle and by example the basic molecular structure for a functionalized monomer or polymer.
Figure 1A:
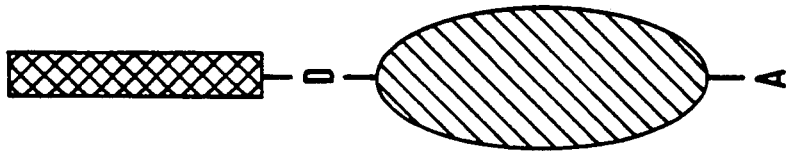
Figure 3:
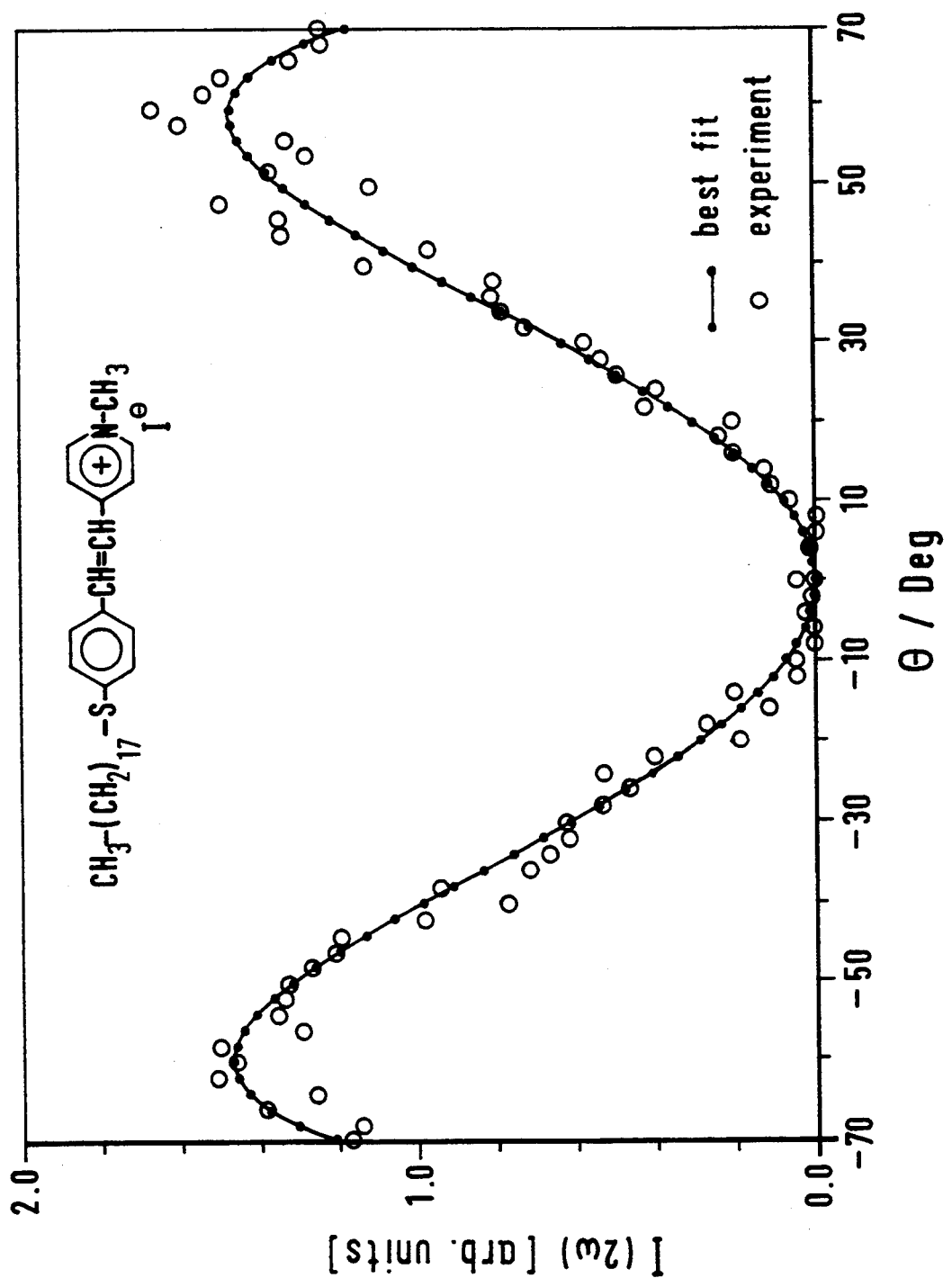
FIG. 3 is a graphical representation of the p-polarized frequency-doubled light intensity as a function of the angle of incidence of the laser beam on the LB monolayer.

To characterize the alternating LB layers as regards their second-order NLO properties, frequency doubling is measured using a Makerfringe apparatus (P. D. Maker et al., Phys. Rev. Lett. 8, 21 (1962)). A p-polarized Nd-YAG laser beam is directed on the layer to be examined. The p-polarized frequency-doubled light intensity is measured as a function of the angle of incidence of the laser beam on the LB monolayer. An example of the kind of curve measured is shown in FIG. 3.

Figure 4:
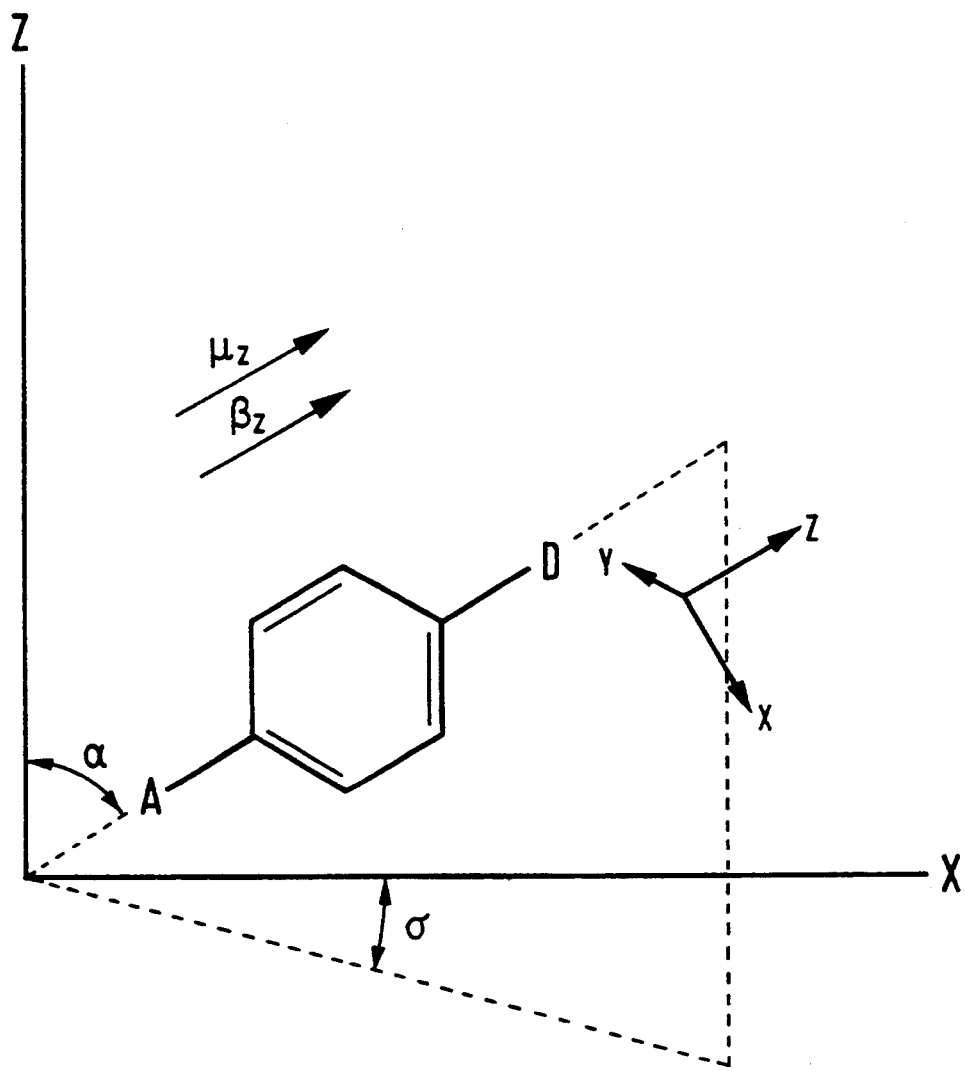
FIG. 4 illustrates the arrangement/orientation of the chromophore in the LB layer.

The ordinate shows the intensity in arbitrary units. The curve is used to determine the maximum SHG intensity. If the orientation of chromophores in the alternating multilayer is independent of the layer thickness, the SHG intensity increases with the square of the number of dye layers. Fitting a theoretical curve derived by J. E. Sipe, J. Opt. Am., B. 4, 4 (1987) 481, to the measured values makes it possible to determine $\chi^{(2)}$. If the measured curve is symmetrical in relation to the perpendicular incidence of the laser beam (0° in FIG. 3), the chromophores in the dye layer are inclined relative to the substrate plane by the average tilt angle $\alpha$; the distribution is isotropic in the substrate plane. FIG. 4 shows the arrangement/orientation of the chromophore in the LB layer. Here A denotes acceptor and D denotes donor. The substrate plane is the plane perpendicular to Z and contains the x-axis. Relative to this plane, there is no preferred orientation of the chromophores; that is, the angles sigma in the substrate plane are in a homogeneous (isotropic) distribution. Good orientation consequently implies, for an isotropic distribution in the substrate plane, a small angle $\alpha$ between the chromophore and the substrate normal; that is, the chromophores are located on a cone resting with its tip perpendicularly on the substrate plane and having an opening angle of $2\alpha$.

EXAMPLE 1: (SHG of dye monolayers, comparative example)

First the SHG intensity of the dye monolayers was determined using the Maker-Fringe apparatus.

For this an LB trough from Lauda is used to coat each of four hydrophilic glass substrates with dye monolayers composed of I and II. The coating conditions used were as follows: for I: water temperature: 20°, surface pressure: 25 mN/m, coating speed: 30 mm/min, for II: water temperature: 20°, surface pressure: 15 mN/m, coating speed: 40 mm/min.

The specimens thus prepared were examined in respect of their SHG properties using the Maker-Fringe apparatus. All of the specimens of the same substance had substantially the same SHG intensities. The SHG intensities of the dye monolayers composed of I were greater than those composed of II, since, first, the chromophore density in the monolayer composed of polymer II is less than in the case of monomer I and, secondly, the substances I and II contain different chromophores.

The dependence of the SHG intensity on the angle of incidence was the same for all specimens composed of I and II. The measured curves are symmetrical relative to 0° incidence. This confirms the above-discussed orientation of the chromophores in the dye monolayer.

Evaluation of the measured curves resulted in the following $\chi^{(2)}$ values for the monolayers: $\chi^{(2)}(I)=50$ pm/V; $\chi^{(2)}(II)=15$ pm/V.

EXAMPLE 2: (SHG of alternating multilayers with I)

To carry out SHG measurements on multilayers of I and the above-listed inactive components, the AB trough was used to prepare specimens on hydrophobic glass using respectively 10, 20, 30 and 50 coating cycles. The layers of I were prepared under the same conditions as the monolayers (cf. Example 1) and in each case transferred on the upstroke. The same transfer conditions were chosen for $\omega$-tric and ODAA. The polymers were transferred under lower surface pressures (PO86: 15 mN/m, TMSC, PiBMA: 20 mN/m) and had higher speeds (up to 100 mm/min).

Figure 5:
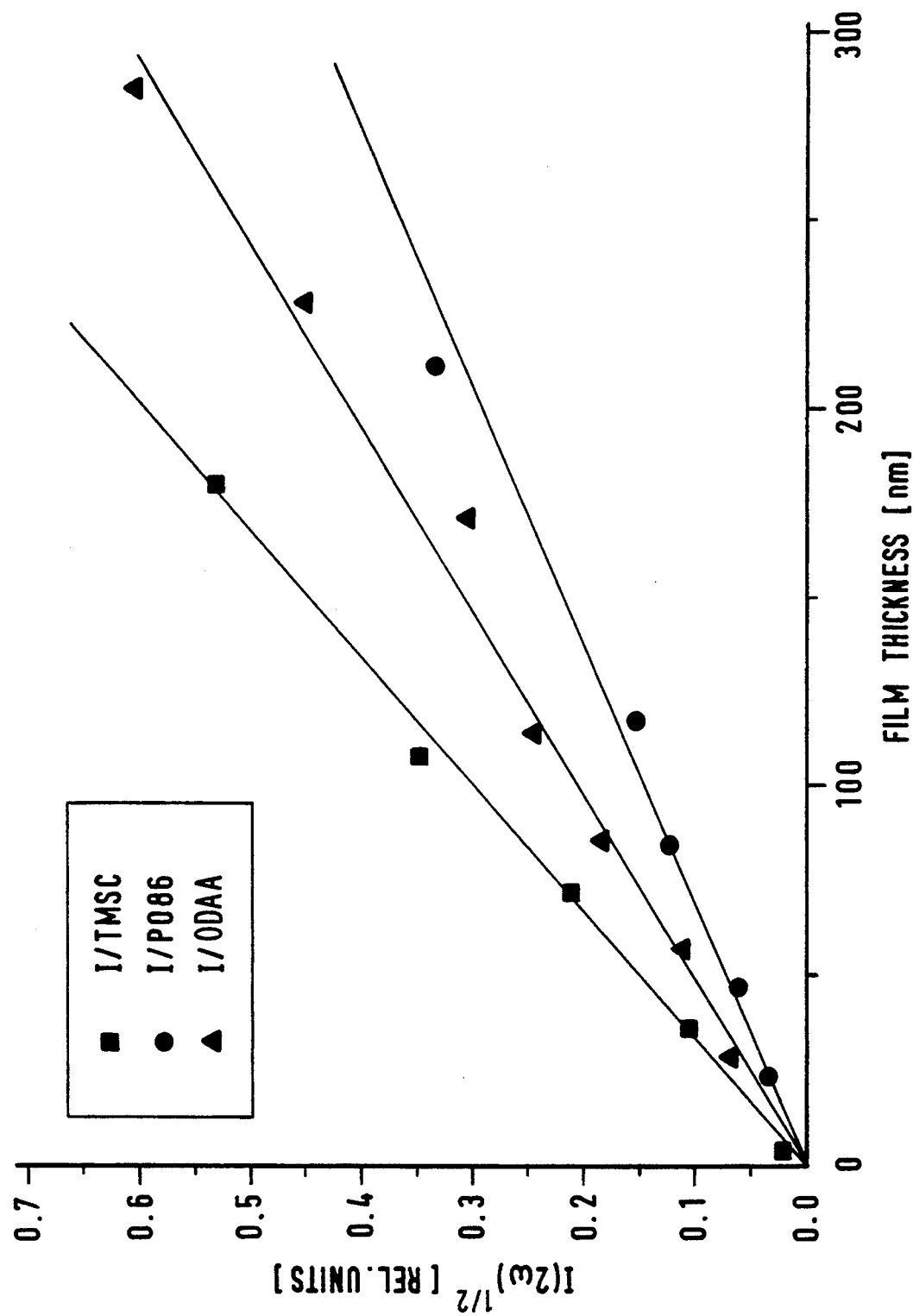
FIG. 5 is a graphical representation of the SHG intensities of the alternating multilayer systems I/TMSC, I/ODAA and I/PO86 increasing with the square of the layer thickness.

Homogeneous alternating multilayers were preparable for all the inactive components. As FIG. 5 shows, the SHG intensities (ordinate: root of intensity) of the alternating multilayer systems I/TMSC, I/ODAA and I/PO86 increase with the square of the layer thickness. The angle-dependent SHG intensities are as in the case of the monolayers symmetrical relative to the perpendicular incidence of the laser beam. The following $\chi^{(2)}$ values for the various layer systems were determined from the measured curves: $\chi^{(2)}(I/PO86)=8$ pm/V, $\chi^{(2)}(I/ODAA)=14$ pm/V, $\chi^{(2)}(I/PO86)=20$ pm/V. The agreement of $\chi^{(2)}$ for specimens of the same alternating layer system which differ in thickness is very good.

As the measurements on the multilayers composed of I/$\omega$-tric and I/PiBMA have shown, the orientation of the dye layers is not preserved in these layer systems. The angle-dependent intensities were no longer symmetrical, which points to additional orientation of the chromophores, parallel to the substrate. The SHG intensities did not rise with the square of the layer thickness. Altogether, the results were not very reproducible. Possible causes for this are the interaction of the $\omega$-tric acid group with the phenylhydrazone and/or the mixing of I/PiBMA layers due to the liquid-analogous character of the PiBMA layer. This would also explain the low SHG activity of the I/PO86 layers.

The studies show that SHG activity and hence the orientation of the chromophores in the alternating multilayer depends on the inactive layer component. In all the layer systems the orientation of the chromophores in the alternating multilayer is less than in the monolayer. Orientation loss is least in the case of I/TMSC. The multilayers of I/TMSC have the highest $\omega^{(2)}$ value and the highest SHG intensities.

EXAMPLE 3: (SHG of alternating multilayers of II)

To prepare alternating layers of II, the choice of inactive layers was confined to the polymers PO86, PiBMA and TMSC. Using the method described earlier, specimens were prepared from 10, 20, 30 and 50 coating cycles. The coating conditions are similar to those of Examples 1 and 2.

In all the three layer systems, the intensity increases with the square of the layer thickness. The increase in the case of II/PO86 and II/PiBMA is distinctly less than in the case of II/TMSC. Moreover, in the case of II/PO86 and II/PiBMA the measured curves are distinctly asymmetrical, which indicates that in these layer systems the chromophores are additionally oriented in the coating direction. The determination of $\chi^{(2)}$ from the measured curves of II/TMSC gave a value of 9 pm/V. A comparison with the value of the monolayer (cf. Example 1), having regard to the layer thicknesses of II (2.9 nm) and TMSC (0.9 nm), shows the orientation of the chromophores in the alternating multilayer to be nearly the same as in the monolayer.

EXAMPLE 4: SHG intensity for multilayers > 50 cycles

Figure 6:
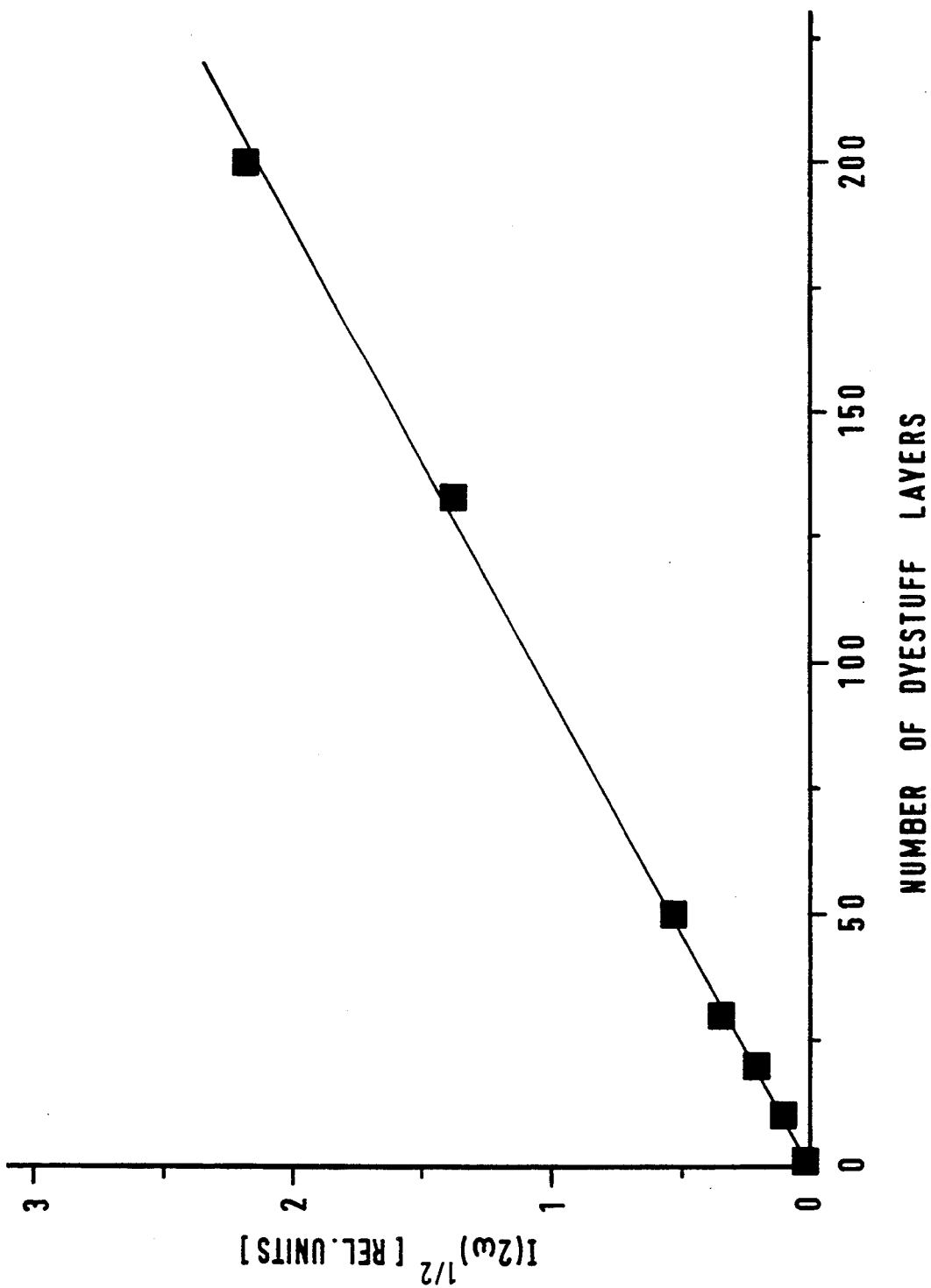
FIG. 6 is a graphical representation of the SHG intensity continuing to increase with the square of the layer thickness even when the number of coating cycles exceeds 50.

The question to be investigated was whether the quadratic increase in the SHG intensity also holds for thicker multilayers. So multilayers were prepared in I/TMSC with up to 200 AB cycles. As FIG. 6 shows, the SHG intensity continues to increase with the square of the layer thickness even when the number of coating cycles exceeds 50. The angle dependence of the SHG intensity is the same for all specimens. So, presumably, the conservation of chromophore orientation in the multilayer system is independent of the layer thickness.

EXAMPLE 5: Light attenuation by 200 cycles of I/TMSC

Figure 7:
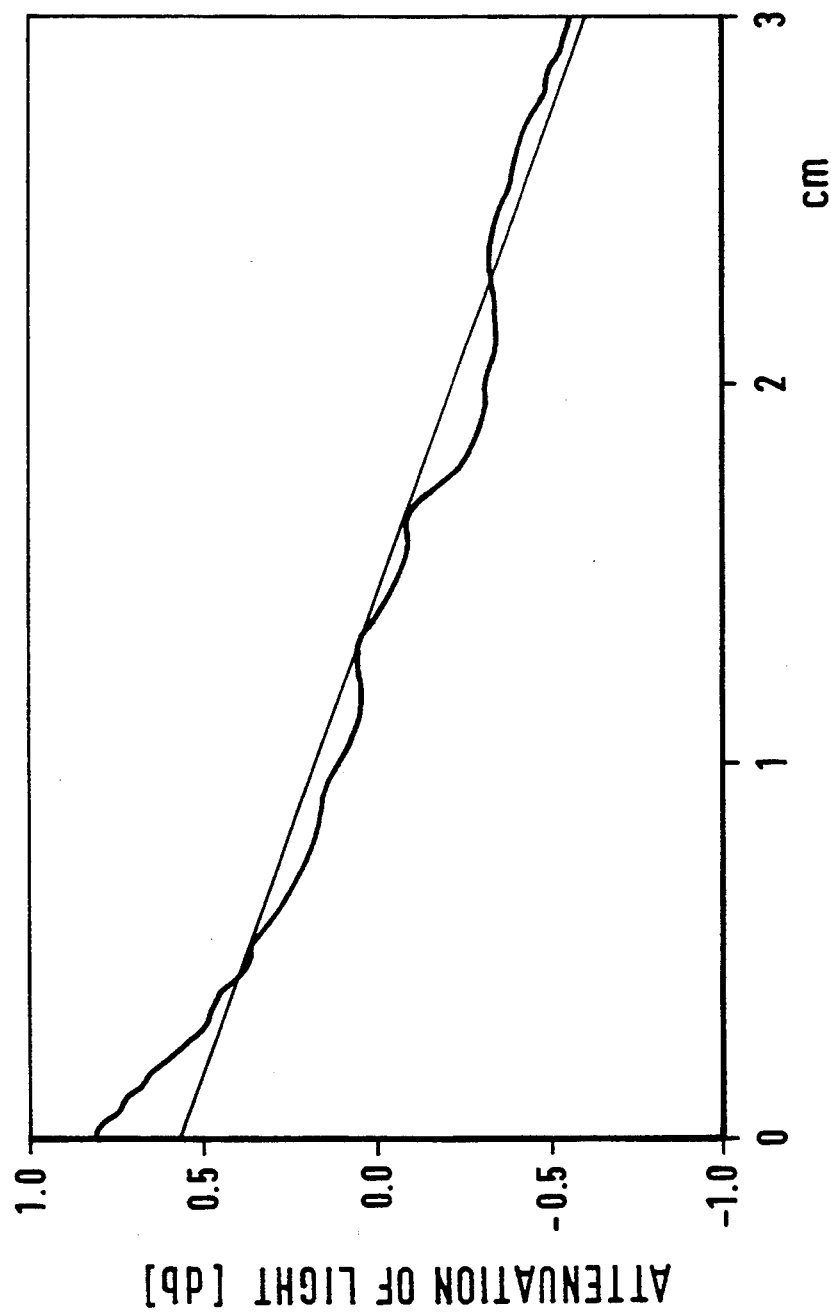
FIG. 7 is a graphical representation of the scattered-light intensity of a TE0 mode measured as a function of location.

Of particular interest was the characterization of the waveguide layer (200 AB cycles I/TMSC) as regards optical attenuation. It was determined by using a prism to couple in a light beam of the wavelength 633 nm and probing the surface of the waveguide layer with an optical fiber to detect the scattered light. The scattered-light intensity of a TEO mode measured as a function of location is depicted with evaluation in FIG. 7.

It shows the intensity of the scattered light (ordinate in dB) as a function of the length of the propagated light (abscissa in cm). The slope (log-linear) and hence the attenuation is 3.5 dB/cm. The decrease in the intensity of the scattered light with the distance from the coupling prism is evident.

This is a very good value for an active layer where more than 80% of the electric field is propagated in the wave-guide layer. The value shows that it is possible in principle to prepare thick active alternating LB layers having good waveguide properties, provided the active layer used is TMSC.

EXAMPLE 6: Thermal stability of TMSC

Figure 8:
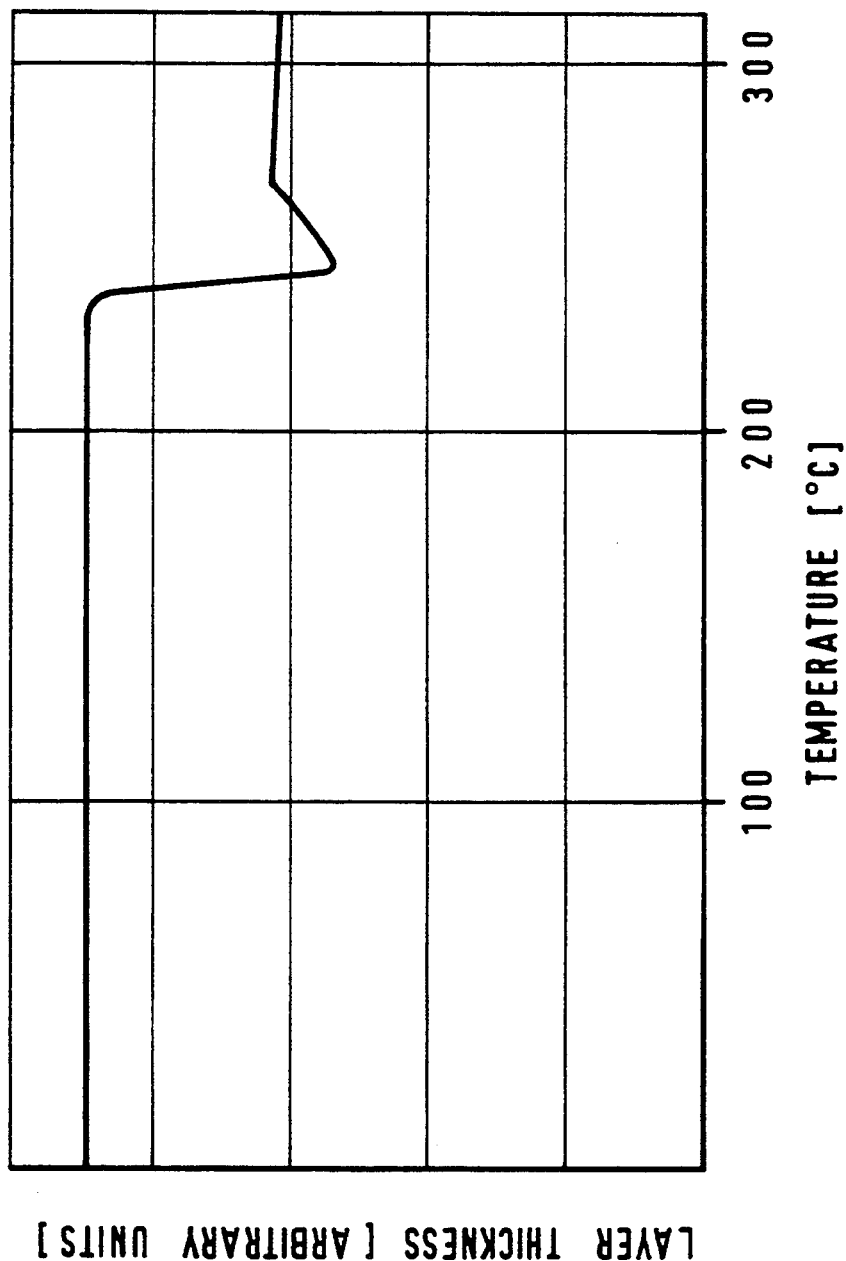
FIG. 8 is a graphical representation of the reflected intensity of polarized laser light as a function of the temperature of an oxidized silicon wafer coated with 30 layers of TMSC.

The thermal stability of LB layers of TMSC was determined by the method of interference-amplified reflection described in P. Tippmann-Krayer et al., Adv. Mater. 3 (1991) 1, 46–51. An oxidized silicon wafer was coated with 30 layers of TMSC. Then the reflected intensity of polarized laser light was determined as a function of the temperature of the substrate. The result is depicted in FIG. 8. It is found that the TMSC layers are thermally stable up to 250° C.

What is claimed is:

1. A layer element comprising a plurality of monomolecular layers in a regular and alternating arrangement ABABAB . . . on a substrate, wherein A is a layer of a dye whose chromophore has a donor-acceptor structure and B is a layer of cellulose whose hydroxyl groups are at least partly substituted by the radical

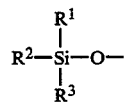

where $R^1$ and $R^2$ are each independently of the other an alkyl radical of from 1 to 4 carbon atoms and $R^3$ is an alkyl radical of from 1 to 18 carbon atoms or phenyl, tolyl or benzyl.

2. The layer element of claim 1, wherein the degree of polymerization of the substituted cellulose is from 100 to 3000.

3. The layer element of claim 1, wherein the degree of substitution of the substituted cellulose is between 1 and 3.

4. The layer element of claim 1, wherein the dye whose chromophore has a donor-acceptor structure is an amphiphilic compound.

5. The layer element of claim 4, wherein the dye whose chromophore has a donor-acceptor structure is a polymeric compound.

6. The layer element of claim 1, wherein the dye whose chromophore has a donor-acceptor structure is a polymeric compound.

7. A method of using a layer element as claimed in claim 1 for linear and nonlinear optics comprising the step of directing a laser beam on the layer element.

8. The method of claim 7 wherein the layer element exhibits a second-order nonlinear polarization effect.

9. The method of claim 8 wherein the polarization effect results in frequency doubling.

10. The method of claim 8 wherein the polarization effect results in parametric amplification and/or frequency mixing.

* * * * *